(12) United States Patent
Segall et al.

(10) Patent No.: US 6,674,521 B1
(45) Date of Patent: Jan. 6, 2004

(54) OPTICAL METHOD AND SYSTEM FOR RAPIDLY MEASURING RELATIVE ANGULAR ALIGNMENT OF FLAT SURFACES

(75) Inventors: Stephen B. Segall, Ann Arbor, MI (US); Juris Upatnieks, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 09/570,248

(22) Filed: May 12, 2000

(51) Int. Cl.[7] .................. G01C 21/06; G01B 11/26
(52) U.S. Cl. .............. 356/150; 356/138; 356/399; 356/153; 356/152.3
(58) Field of Search ................. 356/399, 138, 356/153, 150, 152.2, 400, 152.3

(56) References Cited

U.S. PATENT DOCUMENTS

| | | | |
|---|---|---|---|
| 3,681,849 A | | 8/1972 | Venables, III |
| 3,716,920 A | | 2/1973 | Worthen |
| 4,056,323 A | * | 11/1977 | Ludman .................. 356/106 R |
| 4,774,405 A | * | 9/1988 | Malin ......................... 250/225 |
| 4,950,078 A | * | 8/1990 | Sommargren ............... 356/349 |
| 4,969,744 A | | 11/1990 | Ordell |
| 5,430,539 A | | 7/1995 | Lysen |
| 5,461,472 A | * | 10/1995 | Harvey et al. .............. 356/138 |
| 5,489,986 A | | 2/1996 | Magome et al. |
| 5,774,210 A | | 6/1998 | Gweon et al. |
| 5,825,666 A | | 10/1998 | Freifeld |
| 6,301,007 B1 | * | 10/2001 | Hanlon et al. .............. 356/400 |

OTHER PUBLICATIONS

Chiu, Ming–Horng, et al., Angle Measurement Using Total–Internal–Reflection Heterodyne Interferometry, Optical Engineering, Jun. 1997, 36(6), pp. 1750–1753.
Hilger, Adam, Prism and Lens Making, pp. 406–411.
Malacara, D., et al., Interferometric Measurement of Angles, Applied Optics, vol. 9 No. 7, Jul. 1970, pp. 1630–1633.

* cited by examiner

Primary Examiner—Frank G. Font
Assistant Examiner—Layla Lauchman
(74) Attorney, Agent, or Firm—Harness, Dickey & Pierce, P.L.C.

(57) ABSTRACT

A reconfigurable optical method and system for rapidly measuring relative angular alignment of flat surfaces are provided. The method and system can be used to rapidly and simultaneously measure the relative angular alignment of machined flat surfaces of a manufactured part. The system can measure parallelism, perpendicularity or angular alignment of multiple flat surfaces. The system can also be used to set up a range of reference angles to which machined surfaces can be compared.

26 Claims, 8 Drawing Sheets

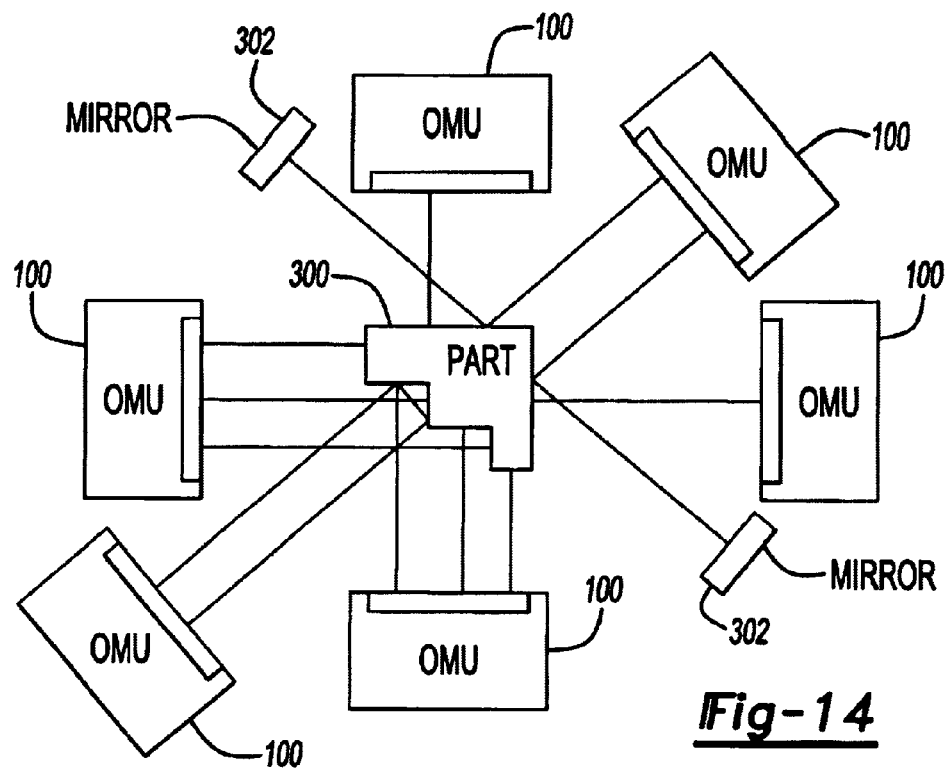
Fig-14
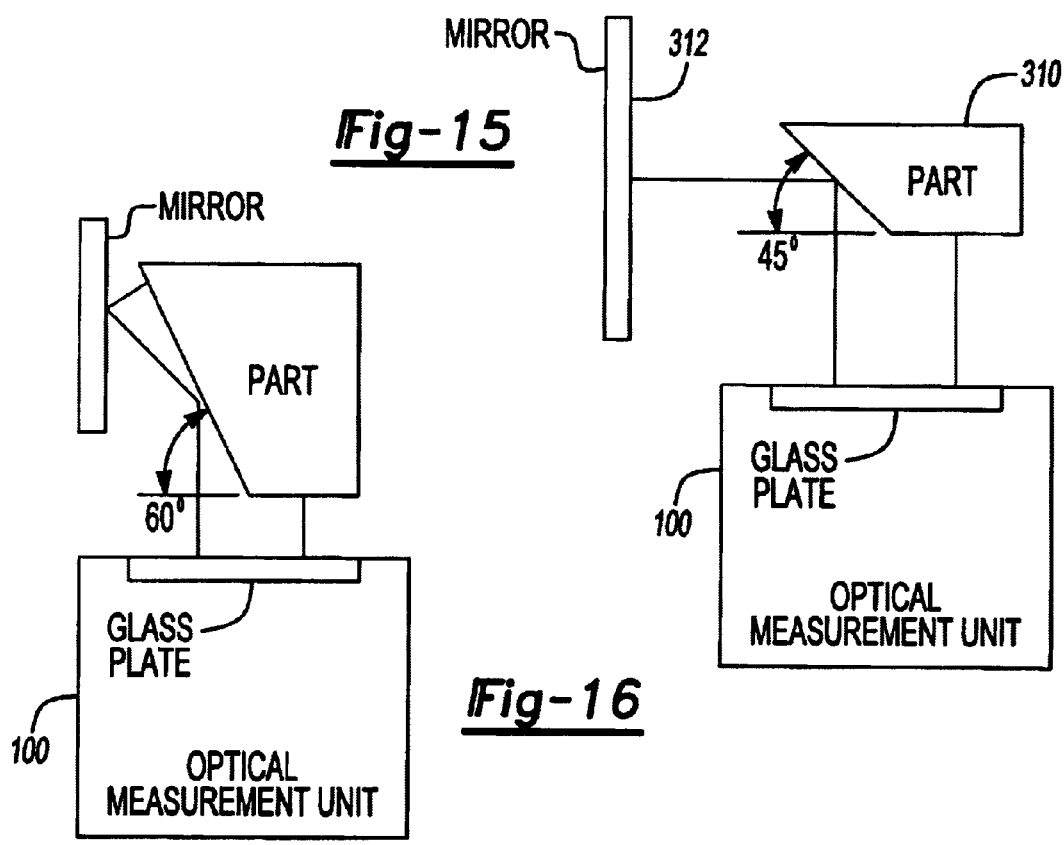
Fig-15
Fig-16

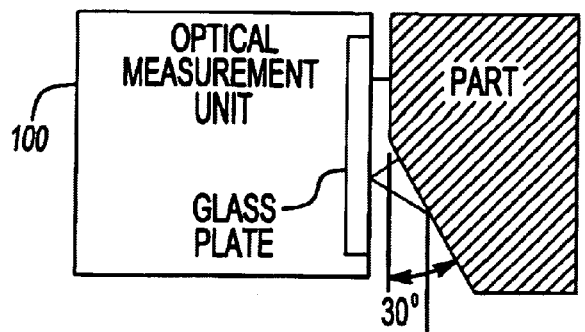
*Fig-17*
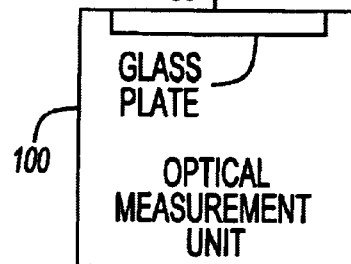
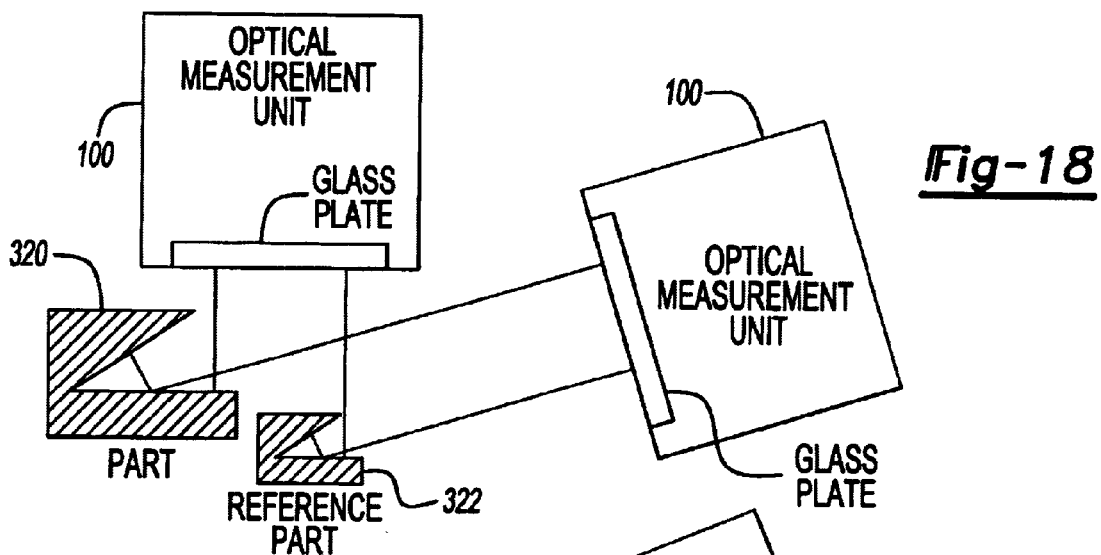
*Fig-18*
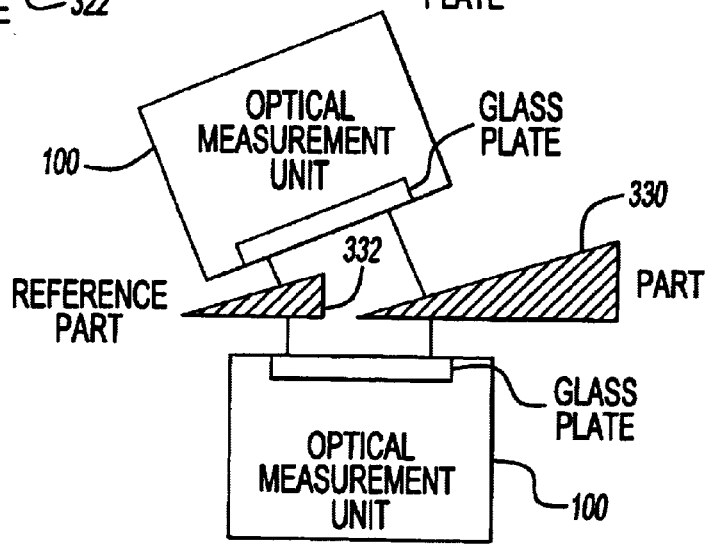
*Fig-19*

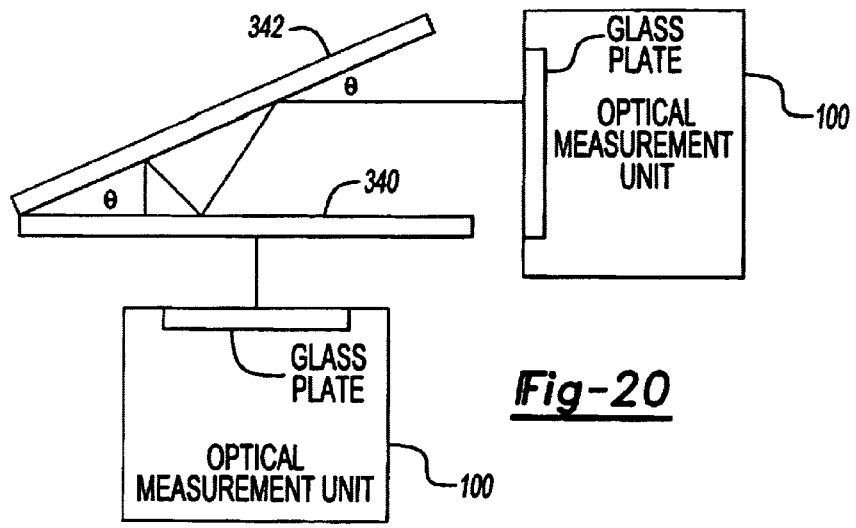
*Fig-20*
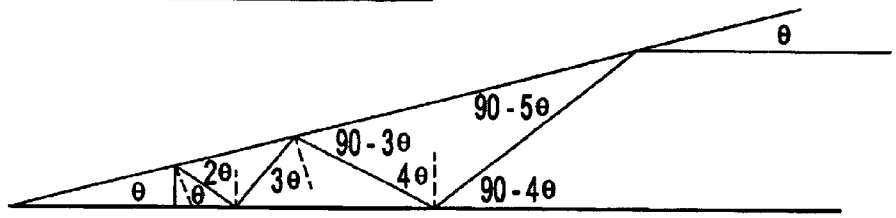
Fig-21
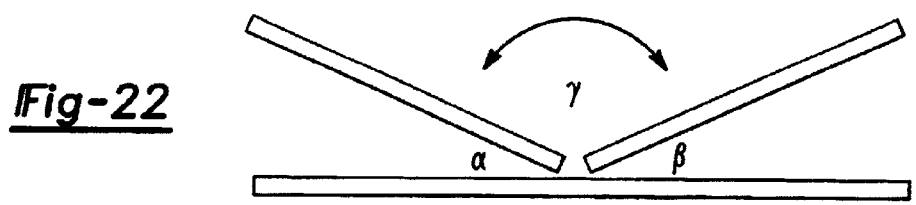
*Fig-22*
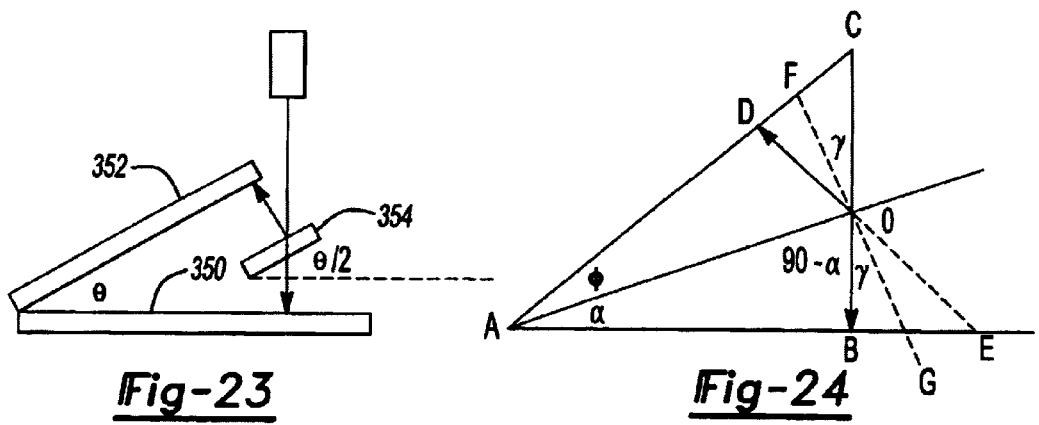
*Fig-23*  *Fig-24*

OPTICAL METHOD AND SYSTEM FOR RAPIDLY MEASURING RELATIVE ANGULAR ALIGNMENT OF FLAT SURFACES

GOVERNMENT RIGHTS

This invention was made with government support under Contract No. EEC-9529125 awarded by the National Science Foundation. The government has rights in the invention.

TECHNICAL FIELD

The present invention generally relates to methods and systems for rapidly measuring relative angular alignment of flat surfaces and, more particularly relates to methods and systems for rapidly measuring relative angular alignment of flat machined surfaces.

BACKGROUND ART

Currently, coordinate measuring machines (CMM) are used to measure the relative alignment of machined surfaces. However, these devices are very slow and may require hours to measure a complex part such as an engine head. In the time required to measure one part, hundreds of defective parts may be produced by the machining system before results of the measurements are available and the error is corrected.

Alternatively, surfaces can be measured using custom-made gauging systems designed to inspect a specific part. These devices are expensive, require long lead times to produce and can only be used for the specific part for which they have been designed. Measurements using such gauging systems generally take several minutes to perform.

Optical instrumentation for performing multiple simultaneous measurements of surface features of an object has been developed by PERCEPTION CORP. Such instrumentation is be used to identify defects in automobile body assembly. The root cause of a defect is then identified using a stream of variation analysis. Each optical sensor images a line of light on a critical surface feature of the vehicle body and measures the contour of the surface by triangulation. Up to 100 such sensors may be used to perform simultaneous measurements over the body of the vehicle. The accuracy of these measurements is about 100 $\mu$m, which is at least an order of magnitude less than the accuracy required for inspecting machined parts.

Optical systems that measure small displacements of machine tools are manufactured by API. Other systems that measure machine errors directly using interferometry are manufactured by ZYGO and HEWLETT PACKARD. OG TECHNOLOGY makes a system that can obtain optical profiles of flat parts from which some machine errors could be inferred. Other manufacturers of optical instrumentation for machining exist, but their instrumentation does not perform the types of measurements required to rapidly obtain precise angular information for machined surfaces.

Techniques for measuring parallelism, perpendicularity and angular alignment can be found in the literature. Some of these include an optical CMM, interferometric techniques, analysis of multiple images from an electronic camera, rotation of an object about a laser beam with measurement of the beam at multiple locations, and various hard gauges. Specific U.S. patents which show these techniques include:

U.S. Pat. No. 4,969,744 Optical angle-measuring device (interferometry);

U.S. Pat. No. 5,430,539 Method and arrangement for checking alignment of body axes for parallelism (rotation about a laser beam);

U.S. Pat. No. 5,774,210 Perpendicularity measuring method and apparatus thereof (analysis of multiple images of an object);

U.S. Pat. No. 5,489,986 Position detecting apparatus (uses two intersecting beams to determine position using interference);

U.S. Pat. No. 5,825,666 Optical coordinate measuring machines and optical touch probes squareness gauge (hard gauge);

U.S. Pat. No. 3,681,849 Squareness gauge (hard gauge); and

U.S. Pat. No. 3,716,920 Precision square (hard gauge).

None of the techniques described in these patents, however, are directed toward the simultaneous measurement of multiple surfaces of a machined part.

Some high precision angular measurement techniques are only useful for very small angles, on the order of a degree. One paper describing how interferometry can be used for this is proposed in "Interferometric Measurement of Angles" by D. Malacara and O. Harris in APPLIED OPTICS 9, 1630–1633 (1970).

A technique that employs total internal reflection to produce an angle dependent phase difference between two directions of polarization that can be detected as a phase shift can be used for a slightly larger range of a few degrees. This is described in "Angle Measurement Using Total Internal Reflection Heterodyne Interferometry" by Ming-Horng Chiu and Der-Chin Su in OPTICS ENGINEERING 36(6) 1750–1753 (June 1997).

The traditional way of measuring arbitrary angles is with a CMM. CMMs are produced by a number of different manufacturers and their use is described in their manuals.

Optical CMMs use imaging cameras and triangulation to obtain surface profiles. This instrument is used in stamping to get surface profiles before and after stamping. Before stamping a grid is drawn on the part, and the distortion of the grid as a result of stamping is determined by triangulation calculations. This technique is less accurate than traditional contact CMMs and would be inappropriate for a machining application.

As noted above, correct alignment of flat surfaces is an important aspect of the quality of machined parts. Despite the above-noted prior art, a technique is needed to rapidly and accurately measure parallelism, perpendicularity and relative angular alignment of machined surfaces to determine whether they are within tolerances.

DISCLOSURE OF INVENTION

An object of the present invention is to provide an optical method and system for rapidly measuring relative angular alignment of flat surfaces with a particular application to the angular alignment of flat surfaces of machined parts.

Another object of the present invention is to provide an optical method and system for rapidly measuring relative angular alignment of flat surfaces wherein the system is reconfigurable so that the surfaces of many different shaped parts can be measured.

Still another object of the present invention is to provide an optical method and system for rapidly measuring relative angular alignment of flat surfaces to reduce ramp-up time of machining systems, maintain machining systems in calibration, reduce down time, and reduce scrap.

In carrying out the above objects and other objects of the present invention, an optical method for rapidly measuring angular alignment of a flat first surface relative to a flat second surface is provided. The method includes directing a first beam of controlled light at the first surface to generate a corresponding reflected first light signal and directing a second beam of controlled light at the second surface to generate a corresponding reflected second light signal. The method also includes receiving the reflected first and second light signals with an optical component for creating first and second spots of light, respectively, in a detector plane. The method further includes measuring position of radiant energy in the first and second spots of light in the detector plane to produce surface measurement signals which represent angular alignment of the first surface relative to the second surface.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIG. 14 is a schematic view of multiple units or systems of the present invention for measuring a complex prismatic part illuminated by multiple laser beams of the systems;

FIG. 15 is a schematic view of a system for measurement of 45° angles;

FIG. 16 is a schematic view of a system to measure whether the supplement of an interior angle is 60°;

FIG. 17 is a schematic view of a system including a pair of units for measuring a 30° supplement to an interior angle;

FIG. 18 is a schematic view of a system for comparing the angle of a part with a reference angle;

FIG. 19 is a schematic view of a system using a reference part to measure exterior angles of a part;

FIG. 20 is a schematic view of a system for setting reference angles using multiple reflections;

FIG. 21 is a schematic view of a portion of a system for setting a reference angle with six reflection points; the condition for which this will occur is 90−5θ=θ and the angle that satisfies this condition is θ=15°;

FIG. 22 is a schematic view of a portion of a system for setting a reference angle greater than 90°; in this example γ=180−α−β;

FIG. 23 is a schematic view of a system for setting an angle to half the value of a given angle;

FIG. 24 is a diagram used for proof of the half angle theorem;

BEST MODE FOR CARRYING OUT THE INVENTION

Figure 1:
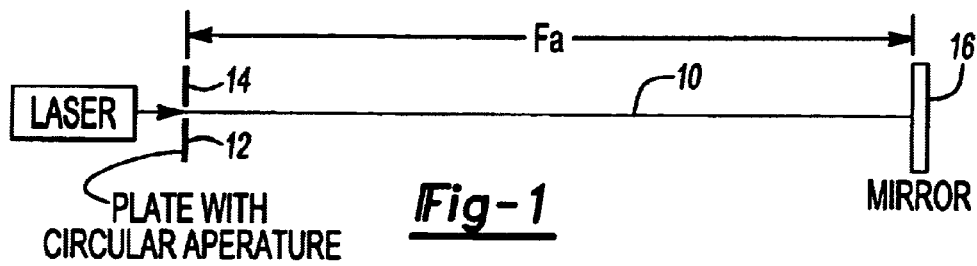
FIG. 1 is a schematic view of a system for measurement of perpendicularity of a plane mirror to a laser beam.

A method and system for simultaneously measuring the relative orientation of flat surfaces of a machined part with multiple flat surfaces to determine whether the part has been machined correctly is described herein. If the surfaces are not machined with the proper alignment, this technique can determine the size of the angular error. Machining of flat surfaces is an important aspect of manufacturing. Flat surfaces mate to other components, so it is important that these surfaces be machined at the correct angles for the assembled product to have the correct shape.

Measurement of the machined parts is important for determining whether they meet required tolerances. One way these measurements are used is for inspection. After inspection, parts that meet tolerances pass and are used, and parts that do not meet tolerances fail and are either scrapped or reworked. Inspection identifies machining errors but does not generally identify the source of the error. Recently, analytic techniques have been developed to use part measurements to identify the root cause of a machining error, so that errors can be rapidly corrected and the machining system can operate with the desired accuracy. This technique is called stream of variation analysis. It has been used previously for car body assembly and is now being extended to high precision machining systems.

It is very important to obtain the results of part measurements rapidly. In a production system sample parts are taken from the machining line and measured. Since the line continues to operate, if a part is defective all the parts that continue to be produced until the defect is identified will generally also be defective. The faster the error can be identified the less scrap will be produced.

The system described herein can determine the relative orientation of flat surfaces in seconds and it can measure multiple surfaces of a part simultaneously. The data can be automatically input into analytic models to diagnose machine errors. To do this the system would usually be configured to measure a particular part. However, if a different part needs to be measured, the system can be reconfigured for the new part. The system described herein can be used to measure parallelism, perpendicularity and other relative angles of machined surfaces.

The invention described herein is an optical measurement system. It measures a part by reflecting the laser beams from various locations on the part surface and analyzing the return signals. The part to be measured is known and the system is configured to perform multiple simultaneous measurements on the part using an array of plates, mirrors and laser beams configured specifically to measure that part. To perform these multiple simultaneous measurements, the part should be placed with a predetermined alignment at a specific preset location. This may be done by mounting the part on a fixture that is placed at a specified location.

Customizing the configuration makes it possible to perform multiple simultaneous measurements on a part. If one wishes to measure a different part, the plates, mirrors, lasers and detectors can be easily reconfigured for a different part. Modular design of the system makes reconfiguration relatively simple and quick. For a more restricted set of measurements the system might be used for a variety of different parts with only minimal reconfiguration. This would be the case if the system were set up to measure only parallelism or only perpendicularity.

The system is designed around a number of simple optical configurations that are described below. The operating principle of the device is first explained and then examples of how it can be used to measure alignment are given.

Aligning a Reflecting Surface Perpendicular to a Laser Beam

A concept used in this invention is the alignment of a reflecting surface perpendicular to a laser beam. Once we are able to do this simple operation, we can then use it in a variety of ways to help determine the relative alignment of flat surfaces of the same part or different parts.

A reflecting surface will be perpendicular to a laser beam if the beam returns precisely on itself after reflection. The greater the distance the laser beam has to travel before its position is measured, the greater the accuracy of the measurement. This is shown in FIG. 1. A beam 10 passing through a circular aperture 12 in a plate 14 is reflected by a mirror 16 back onto the aperture 12. The plate 14 containing the aperture 12 is set approximately perpendicular to the beam 10. The incident beam fills the aperture 12. If the return beam is symmetric about the aperture 12, the mirror 16 will be perpendicular to the beam 10.

Figure 2:
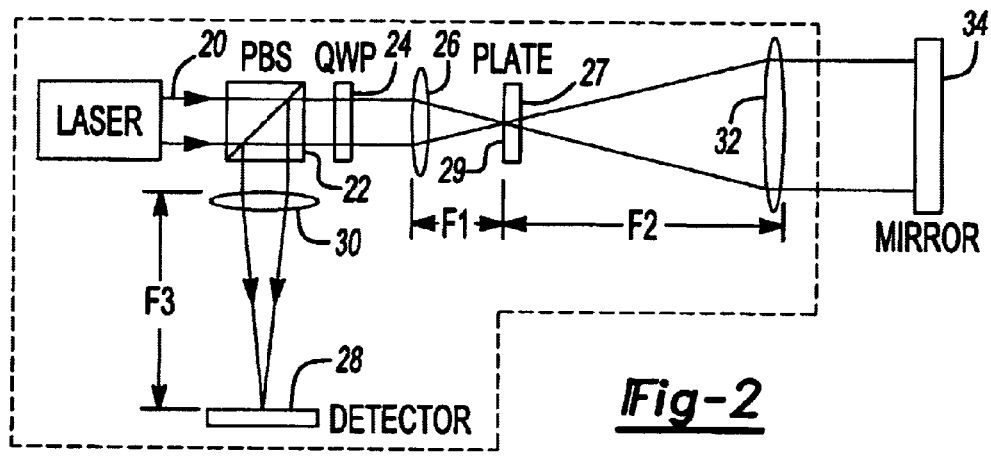
FIG. 2 is a schematic view of a detector system that can measure absolute perpendicularity of a mirror relative to a laser beam; PBS stands for polarizing beam splitter and QWP stands for quarter wave plate.

The accuracy of this measurement is a function of the distance Fa between the aperture 12 and the mirror 16. For example, if the distance Fa between the aperture 12 and the mirror 16 is 10 m and the return beam can be centered on the aperture 12 to an accuracy of 1 mm, then the angular accuracy of the alignment will be $10^{-4}$ radians. It would be desirable to develop an approach that could be more accurate over shorter distance. A configuration that does this is shown in FIG. 2.

Everything within the dotted line is a single unit. Perpendicularity is measured relative to the beam leaving the unit, not relative to the beam leaving the laser. The laser in FIG. 2 would preferentially be a diode laser. The beam 20 from the laser would have its direction of polarization oriented so that it is transmitted through the polarizing beam splitter 22. A polarizing beam splitter 22 is preferred rather than a non-polarizing one, because the light can be used more efficiently and less light goes into stray beams that might produce errors in the measurement system.

The beam leaving the beam splitter passes through a quarter wave plate 24 and a lens 26 with focal length F1. This lens 26 focuses the light onto the surface 29 of a mirror or a glass plate 27. If a transparent glass plate is used, one side of the plate may be coated to enhance its reflectivity and the other side could be anti-reflection coated. At the position of best focus, the light will be reflected back into a parallel beam by lens 26 with a focal length F1. This beam will then be focused to a point on the surface of a detector 28 by a lens 30 with focal length F3. The detector 28 could be a CCD camera.

If the reflecting plate 27 is precisely perpendicular to the laser beam 20 but the beam 20 is not focused at the reflecting surface 29, the laser beam 20 will be imaged to a spot rather than a point on the detector 28. The center of the spot would be at the same location as the smaller spot that would be produced if the reflecting surface 29 were placed precisely at the focal point of the lens 26. If the plate 27 is not precisely perpendicular to the beam 20 and the beam 20 is not focused at the reflecting surface 29 of the plate 27, the spot will be projected to a different location on the detector 28.

When the spot is focused on the reflecting plate 27, the beam will be reflected back into a parallel beam and always be focused at the same point on the detector 28, even when the reflecting plate is not aligned precisely perpendicular to the laser beam. The point on the detector 28 to which the reflected spot is focused is the same point that light Would be focused to if the beam were collimated by lens 32 at focal length F2 and reflected from a mirror 34 perpendicular to the beam 20. Comparing the location a collimated beam of light with the location a beam reflected from a focal spot enables one to accurately determine whether an external mirror is perpendicular to the laser beam.

Once the beam has been focused onto the reflecting surface 29 and the location of the spot on the detector 28 has been recorded, the reflecting glass plate can be moved out of the beam. The beam focused by lens 26 is then expanded, recollimated, reflected from a mirror 34 and passed back through the optical system. If the mirror 34 is perpendicular to the beam 20, the spot will be focused onto the same point as when the beam was focused on the reflecting plate 27. If a partially reflecting plate were positioned at the focal point of lens 26, two spots would be focused onto the detector, one from the plate and one from the external mirror. The distance between the spots would determine the deviation from perpendicularity of the external mirror with respect to the laser beam.

This measurement could also have been performed using a position sensitive detector rather than a CCD camera. CCD cameras are less accurate than position sensitive detectors because resolution is limited by pixel size. If the beam is irregular and spread out over a number of pixels, a computational algorithm must be used to determine the intensity averaged center of the spot. Position sensitive detectors automatically integrate the signal to determine the position of the centroid of the beam and have a resolution on the order of 1 $\mu$m or better for the position of the centroid. The signals from a position sensitive detector therefore require less analysis. However, a position sensitive detector can only view one spot at a time and is sensitive to stray light. Stray beams of light could produce errors in the measurement of position and diffuse background light reduces the sensitivity of the position sensitive detectors. For this reason, CCD cameras are preferred for this application.

The sensitivity of the system to deviations from perpendicularity is directly proportional to the ratio between the two focal lengths F2 and F1. If the angular deviation of the return beam is Δθ, it will be imaged a distance F2xΔθ from the center line of lens 32. The angular deviation of this image point for lens 26 will be F2xΔθ/F1. So the angular sensitivity of the detector 28 is increased by the factor F2/F1. Δθ is twice the alignment error of the mirror. The sensitivity of the device also is a function of the resolution of the detector 28 and the focal length F3 of the lens 30 that focuses light onto the detector. The location of the spot on the detector 28 relative to the reference spot will be F3x (F2xΔθ)/F1. If the smallest increment that can be resolved is Δx, the angular resolution of the detector will be:

$$\Delta\theta = \frac{F1}{F2}\frac{\Delta x}{F3}$$

Figure 3:
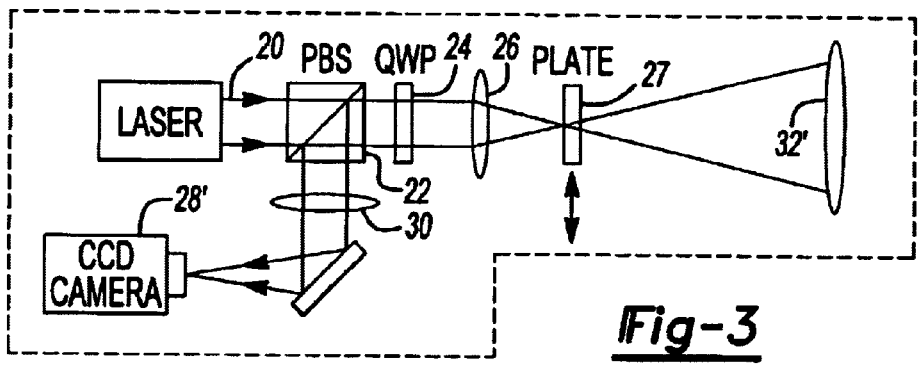
FIG. 3 is a schematic view of a compact module for producing a laser beam that can be aligned perpendicular to an external reflecting plate.

Suppose the smallest increment of motion one can detect on the detector is 5 μm, F3=100 mm, F1=20 mm and F2=160 mm. Then Δθ=6.25×10$^{-6}$ radians. The deviation of the mirror from perpendicularity will be half that value or 3.125×10$^{-6}$ radians. A more compact module that could be used for producing a laser beam that can be aligned precisely perpendicular to an external reflecting plate is shown in FIG. 3.

Measuring Parallelism Between Two Reflecting Surfaces

Figure 4:
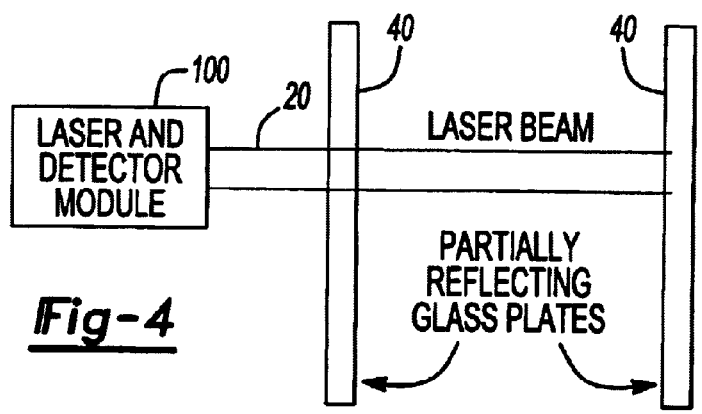
FIG. 4 is a schematic view of a system for aligning two plates of glass parallel to each other.

Using the module described above, one can align two glass plates so that they are precisely parallel to each other. This is shown in FIG. 4. All transparent surfaces that are not anti-reflection coated will be partially reflecting. The reflectivity of an uncoated glass surface in air is about 4 percent. Reflectivity may be increased by depositing a thin reflecting film on the surface. Reflectivity may be reduced by coating the surface with an anti-reflection coating.

For greatest accuracy, the two glass plates 40 in FIG. 4 would be interferometrically flat, coated on one side with a partially reflecting coating and coated on the opposite side with an anti-reflection coating. If the location of the reflections from the plates 40 on the detector in laser and detector module 100 is the same for both plates, the plates 40 will be parallel to each other. Comparing the distance between the two focused spots makes is possible to quantify the angle by which the two surfaces are not parallel.

While it is not essential that the plates 40 be aligned perpendicular to the laser beam 20 to determine whether they are parallel, it is desirable. If the plates 40 are not perpendicular to the beam 20, the incident and return beams will interrupt different locations on the polarizing beam splitter 22. If the reflection angle is too great, one or both return beams may miss the beam splitter 22 entirely. The measurement range is determined by the angular variation over which the return beams are reflected by the beam splitter 22 onto detector 28 or 28' and is maximized when the glass plate is perpendicular to the beam.

Measuring Parallelism for Surfaces of a Part

Figure 5:
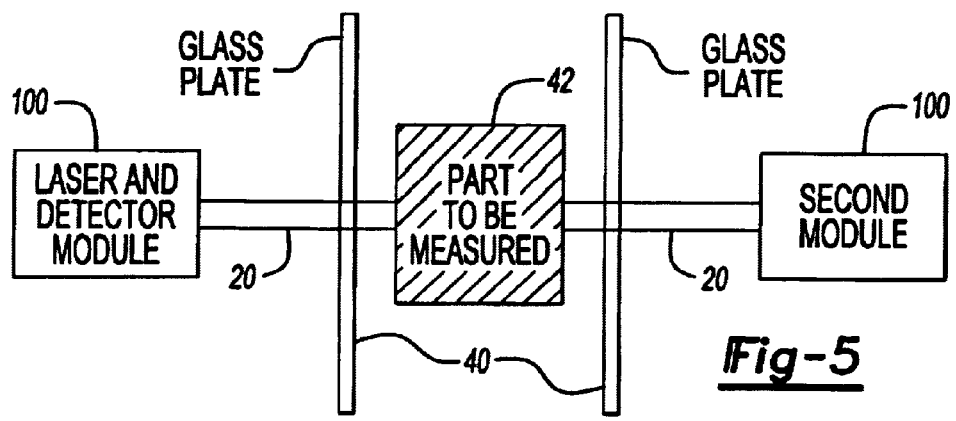
FIG. 5 is a schematic view of a system to measure the parallelism of two opposite surfaces of a part.

Once the two glass plates 40 have been adjusted so that they are exactly parallel, they can be used to determine whether two surfaces of a part are parallel to each other. Suppose we insert an object 42 between the two glass plates 40 and wish to determine if opposite surfaces of the part 42 are parallel. We could adjust one of the surfaces so that it is parallel to one of the glass plates, then the degree to which the other surface is parallel to the second glass plate could be measured. A second laser and detector module 100 would be required to do this measurement as illustrated in FIG. 5.

Different surfaces on the same side of a part could be checked for parallelism by using a different laser module 100 for each surface being measured to determine the deviation from parallelism of each surface with the glass plate.

Design of a Reconfigurable Optical System

Figure 6:
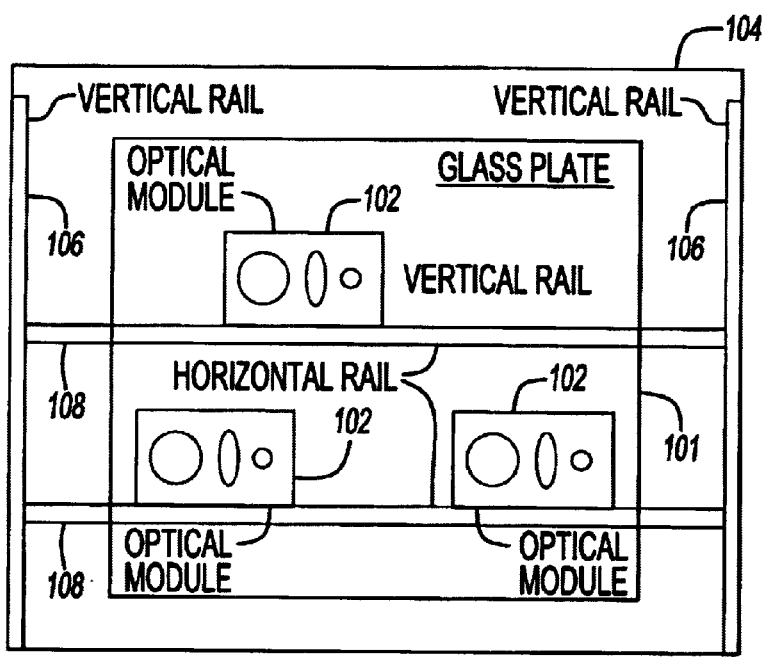
FIG. 6 is a schematic view of a housing containing a glass plate and optical modules; the location of the modules can be varied by moving the horizontal rails and by changing the location of a module along the horizontal rails.

In practice, a glass plate 101 and its associated optical modules 102 would be a single unit as illustrated in FIG. 6. A single box-like structure 104 contains both the glass plate 101 and the laser detector modules 102 with each of their laser beams aligned perpendicular to the glass plate 101. Modules 102 are arranged in space so that their beams point at specific predetermined locations for measurement of the part. Vertical rails 106 mounted to the side of the box support horizontal rails 108 that, in turn, support the modules 102. The horizontal rails 108 are fixed at any vertical position and the location of a module 102 mounted on two horizontal rails 108 is adjustable horizontally (FIG. 6). The entire system may be automated so that each module 102 could be positioned in any location within the area of the glass plate 101. Of course, if more than one module 102 is used, there would be restrictions on how close two modules 102 could be since they cannot occupy the same physical space.

Figure 7:
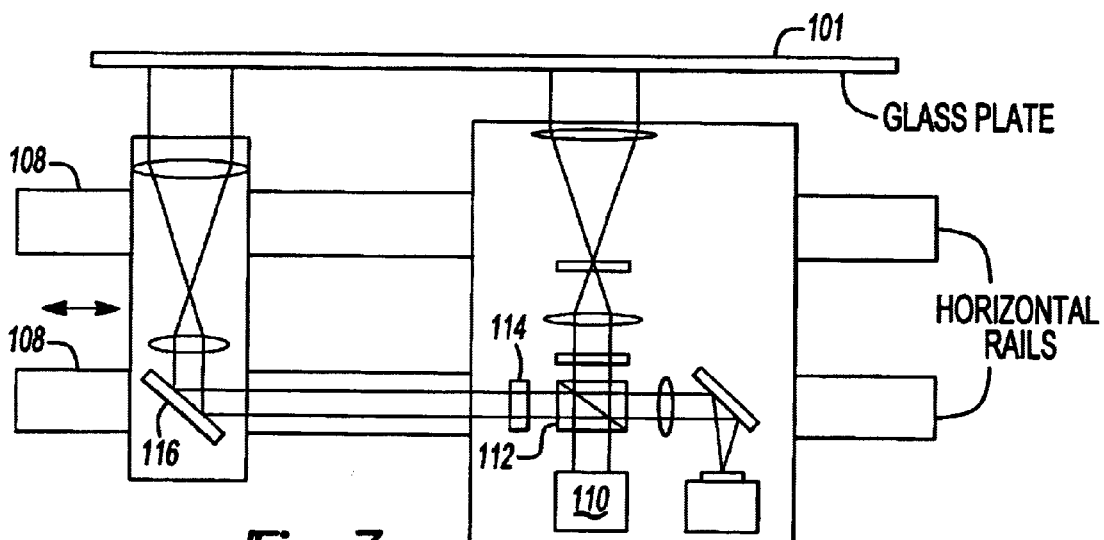
FIG. 7 is a schematic view of a system having two beams at different horizontal locations produced using a single optical module; light from the laser passes through a quarter wave plate before being reflected by the turning mirror.

It is also possible to produce multiple beams using a single laser as illustrated in FIG. 7. This could reduce the cost of the system. To produce two beams adjust the polarization of the laser 110 so that approximately half the beam is transmitted by the polarizing beam splitter 112 and half the beam is reflected. The beam reflected by the polarizing beam splitter 112 passes through a quarter wave plate 114 and is reflected by a turning mirror 116. The turning mirror 116 can be moved along the horizontal rail 108 to position the second beam along the rail 108. The turning mirror 116 would be adjusted so that the second beam returns on itself after it is reflected from the glass plate 101. When this happens the unit will produce two parallel beams. To distinguish between the return signals in this case it may be necessary to block one beam while the position of the spot from the other beam is recorded.

A three beam system could be produced by inserting a platform with a beam splitter instead of a turning mirror between the platform with the turning mirror and the module with the laser and detector. If a 50/50 non-polarizing beam splitter is used, a beam dump may be needed behind the beam splitter to absorb he unwanted beams. More beams could be produced by increasing the number of beam splitters.

The same laser that produces multiple horizontal beams could also produce multiple vertical beams by adding an additional beam splitter in the beam line directing light up or down to a pair of turning mirrors that direct the beam to the desired position on the glass plate. Any beam that returns on itself will be perpendicular to the glass plate. The transmission of each beam splitter must be chosen so that the beams returning to the detector all have approximately the same intensity. With multiple beams, it may be necessary to block all but one at a time to accurately determine which spot belongs to a given beam.

As mentioned above, it is desirable but not essential that the laser beams be perpendicular to the glass plate. During calibration of an optical unit, the beams should be aligned perpendicular to the glass plate. If the beams vary slightly from true perpendicularity as a result of time varying beam wander of the laser beam, the position of the focused spot from the glass plate will vary with time. If a surface to be measured is parallel to the surface of the glass plate, the return beam from that surface will still be at the same location on the detector as the beam reflected from the glass plate. The deviation from parallelism can be calculated from the distance between the two spots. Therefore, small variations in the direction of the laser beam will be automatically compensated.

Figure 8:
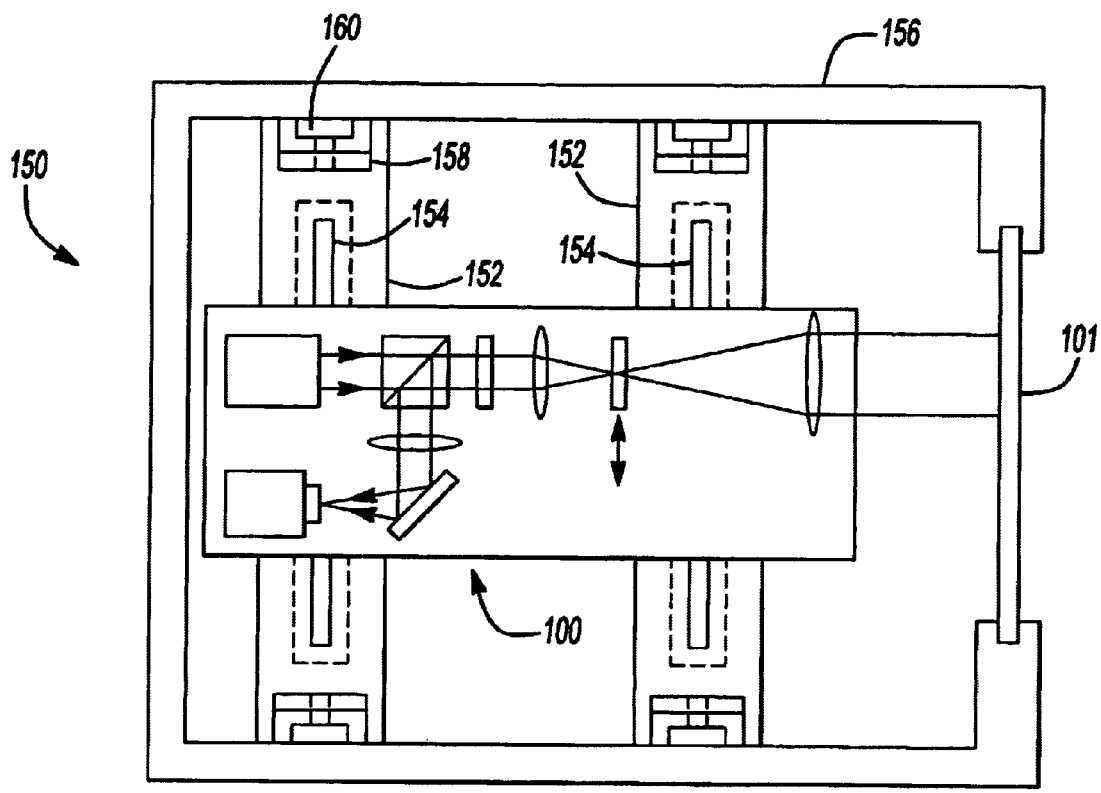
FIG. 8 is a schematic view of a housing containing a glass plate and a laser-detector module in which adjustment of the optical components would be performed manually.

A simple design is shown in FIG. 8 for a manually adjusted system 150 with a single beam. Vertical rails 152 with slots 154 are mounted on opposite walls of the structure 156. Threaded nuts can be inserted into the rails 152 before they are mounted. Horizontal rails 158 have end slots to move along the vertical rails 152 and brackets for mounting to the nuts 160 in the vertical rails 152. The height of each end of a horizontal rail is set using a rod cut to the desired height of the rail. Each end of the rail is fastened at the height at which it sits on the rod so that the horizontal rail is parallel to the floor of the housing.

Two rails 152 are needed for each laser detector module 100. The horizontal rails 158 are slotted so that the module can be attached to nuts 160 inserted under the rails. The horizontal location of the module 100 can be set using a rod cut to the desired length and the module can be fastened when it butts up against the rod positioned on each horizontal rail. The base of the module 100 is then parallel to one side of the housing 156. Angular adjustments of the components of the module 100 and, if desired, the module 100 as a whole can be performed to align the laser beam precisely perpendicular to the glass plate 101. This procedure can be followed for each of the modules in the housing.

If it is desired to measure a different part or the same part in a different orientation, the modules could be easily reconfigured for the new set of measurements. If the system were automated this could be done automatically.

The entire structure can be adjusted as a unit to align it relative to another glass plate or to a machined surface. Mounts for aligning large optical components are available commercially.

Specular Reflectivity of the Part

One problem that must be addressed when using the device of the present invention with machined parts is the specular reflectivity of the machined surface. In general, a machined surface is microscopically rough so that light is scattered from the surface rather than specularly reflected. One possible solution to this problem is to place a mirror on the surface of the part at every location at which a measurement is to be performed. This could be accomplished by building a structure to hold an array of mirrors at the same relative positions as the locations of the measuring beams. A structure similar to the reconfigurable structure used to hold the optical modules could be used to position the mirrors in space. After the part has been set in position for measuring, the structure holding the mirrors can be moved toward the part until the mirrors make contact with the part. Measurements could then be performed.

Figure 9:
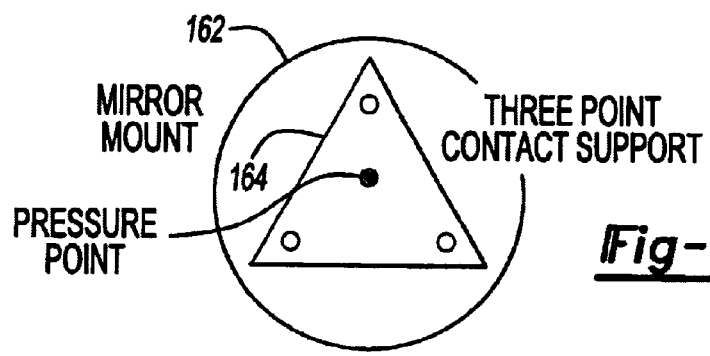
FIG. 9 is a schematic view of a mirror holder that would permit a mirror to be aligned parallel to the surface of a part.

This approach will work if the surface of each mirror is precisely parallel to the surface it is in contact with. Each mirror would be set in a mirror mount 162 with two angular adjustments that would be mounted on a base with a three-point contact 164 (FIG. 9). To align the mirrors parallel to a surface with which they are in contact, the mirrors would first be aligned parallel to an interferometrically flat reflecting surface. During calibration the housing with the optical modules and glass plate would be used to measure the parallelism of the mirror relative to the surface on which it is set. If the mirrors are then placed on a flat machined surface they will be parallel to that surface.

To prevent the base holding the mirror mount from distorting, it may be attached to the movable support structure with a spring mechanism so that only minimal pressure will be needed to keep it in contact with the machined surface.

While the approach of using mirrors to enhance specular reflectivity of the surface of the part will work, there may be other approaches to enhancing specular reflectivity that may simplify the use of this system and reduce its cost. If a part with a highly polished or diamond turned surface is measured, it may be sufficiently reflective to perform the measurements without any mirrors. If this is not the case, it still may be possible to extract the specularly reflected component of the beam from the light returning to the optical module.

Specular reflectivity may be enhanced by making the surface of the part microscopically flatter. This may be done by coating it with a thin film or liquid layer that smooths out the irregularities of the machined metal surface. This technique can be used provided that either the film surface is precisely parallel to the surface of the part or, if it is not parallel, it varies in a known way that can be compensated when the resulting data is reduced. Confocal microscopy can be used to simultaneously measure the surface of a transparent film and the metal surface to which it adheres to determine which films are acceptable.

Parts coming out of a machining system are already coated with liquid coolant. This liquid fills in the small irregularities in the metal surface with a layer that is held in place by surface tension. The force of the surface tension is much greater than the force of gravity. If these liquid layers are sufficiently flat, the return beam may be sufficiently well defined to perform the measurement. If this is not the case, an additional liquid coating may be applied with a different viscosity that could better smooth out the variations of the surface. A liquid may also be chosen that has enhanced reflectivity at the wavelength of the laser light. Alternatively, small strips of tape such as cellophane tape or aluminized mylar tape could be attached to the surface provided the thickness of the tape is sufficiently uniform and it is applied so that no gap is produced between the part and the tape. This could also be tested using a confocal microscopy system.

In conclusion, there are several possible ways to generate sufficient specular reflection from a machined surface to make accurate measurements of relative alignment of surfaces. Any of these techniques may be used with this invention.

In practice, the return signals from both the glass plate and the part surface must be in an intensity range that is above threshold and below saturation. One way of ensuring that this is the case is by specifying the reflectivity of the surface of the glass reference plate. The reflectivity could be adjusted so that the intensity of the signals from the glass plate and the part surface would be in approximately the same range.

Measuring Parallelism of Opposing Surfaces

Figure 10:
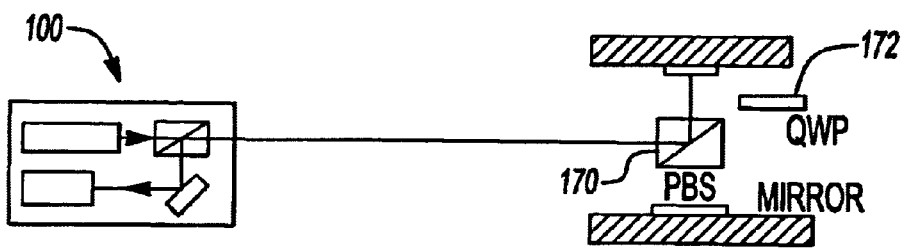
FIG. 10 is a schematic view of a system illustrating a first step in the process of measuring the parallelism of two opposing surfaces.

An additional polarizing beam splitter 170 and quarter wave plate 172 is needed for each two surfaces to perform this measurement. The quarter wave plate 172 would be placed on a mount that could be moved in or out of the beam. With the quarter wave plate 172 out of the beam, the beam splitter 170 would be aligned so that the beam is perpendicular to one of the surfaces. When this happens the beam will return back on itself (FIG. 10).

It is to be noted that all of the optical components of the system of the present invention are not shown in FIGS. 10–14 for purposes of simplicity.

Figure 11:
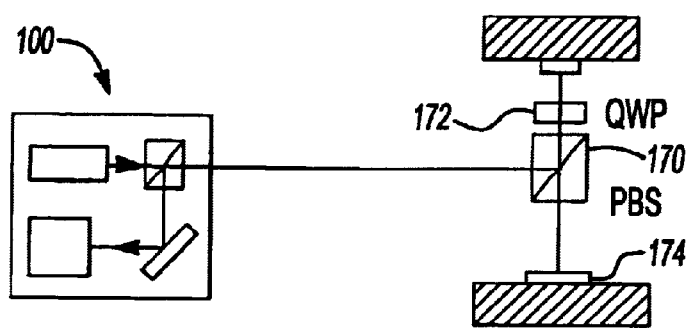
FIG. 11 is a schematic view of the system of FIG. 10 illustrating measurement of parallelism of two opposing surfaces.

When the quarter wave plate 172 is moved into the beam, the beam reflected from the first surface is transmitted through the polarizing beam splitter 172, reflects off the second surface 174 and is then reflected back to the detector after passing through the quarter wave plate 172 a second time (FIG. 11). If the return beam is focused to the same point on the detector as before, the two surfaces will be parallel.

Measuring Perpendicularity of Flat Surfaces

Figure 12:
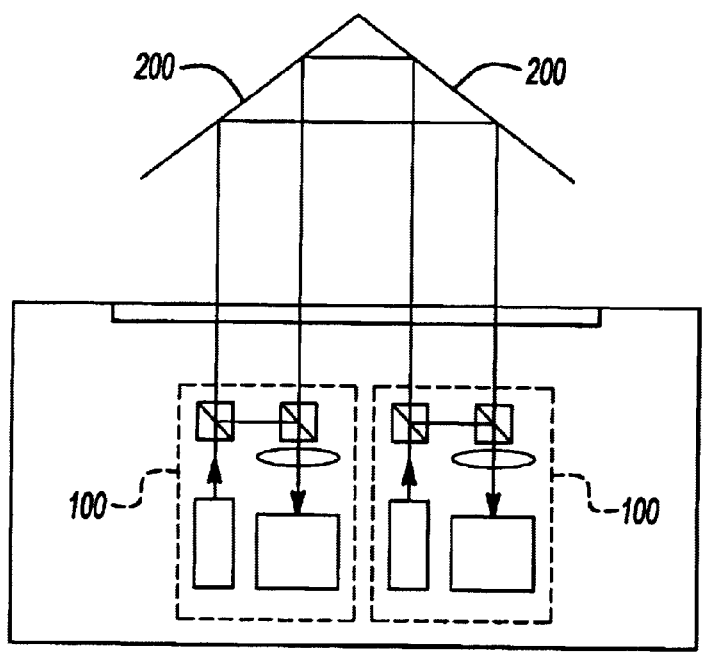
FIG. 12 is a schematic view of a system to measure perpendicularity of an interior angle formed by two flat surfaces.

The optical system described above for measuring parallelism can also be used to measure perpendicularity of flat reflecting surfaces. All the beams produced in the housing of an optical unit are aligned parallel to each other, since all are perpendicular to the glass plate. Consider two modules 100 mounted on the same horizontal rail. The two beams lie in a horizontal plane. These beams can be used to measure perpendicularity of two adjacent vertical surfaces 200. First consider two surfaces that form an interior angle. If the plane of the beams is orthogonal to the two surfaces 200 and the angle between the surfaces is 90°, a beam reflected from both surfaces will return parallel to the incident direction (FIG. 12).

The distance between two horizontal modules can be set so that when a beam from one module is reflected from two perpendicular surfaces of a part, it will be focused onto the detector of the second module. If the part surfaces are perpendicular to each other and the plane of the two laser beams is perpendicular to the surfaces being measured, the return beam will be focused to a point coincident with the reference point of the second module. The reference point is the point to which the laser beam returning from the glass plate is focused. The deviation from perpendicularity can be calculated by measuring the distance between the two spots.

If the part surfaces are perpendicular to each other, but are not perpendicular to the plane of the laser beams, the return beams will not be located at the reference points of the detectors. If there is a pitch angle between the plane of the laser beams and the surfaces being measured, both return beams will be either above or below the reference points. If there is roll angle between the plane of the laser beams and the surfaces being measured, one beam will lie above the reference position and the other beam will lie below the reference position on the detector. The optical measurement unit can be realigned so that both return beams lie in the same horizontal plane as the beams leaving the detector unit. When this happens the distance between each return beam and its reference point will be minimized and this difference will be a measure of the deviation of the two surfaces from perpendicularity.

Perpendicularity of Exterior Angles

Figure 13:
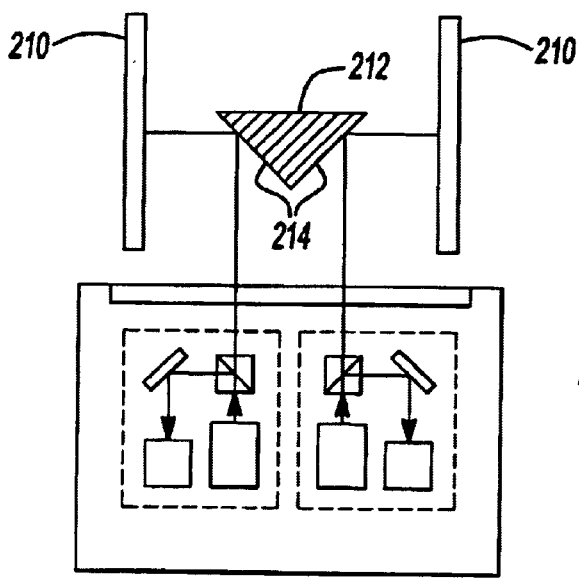
FIG. 13 is a schematic view of a system to measure the perpendicularity of an exterior angle.

In this case two stand-alone glass plates 210 are set up parallel to each other and the part 212 is moved into position between the plates (FIG. 13). The method to determine if two plates are parallel has been previously described.

The part 212 is located so that each surface 214 makes approximately a 45° angle with a glass plate. If the angles are exactly 45° and the part surface is perpendicular to the plane defined by the laser beam and the normal to the glass surface, the return beams are focused to the reference positions of the modules. After correcting for misalignment of the part surface relative to the laser beam, the deviation from perpendicularity can be calculated from the deviation from the reference positions of both beams.

Simultaneous Measurement of Parallelism and Perpendicularity

To rapidly measure a complex part, it is desirable to perform as many measurements as possible simultaneously. This can be done by custom configuring the optical measuring instrumentation for a specific part. Once the instrumentation has been set up, measurement of the part can be performed rapidly by positioning the part at a predetermined location in the system. A fixture may be needed to precisely position the part in the measurement system.

While the system may be designed for a specific part, the instrumentation can be reconfigured and used to measure another part if this proves necessary. This arrangement is most useful for a production line in which the same part needs to be measured repeatedly. However, if, as a result in design changes or market conditions, a different part is to be produced by the machining system, the measurement system can be reconfigured to measure the new part.

Suppose we have a part with multiple prismatic surfaces that are either parallel or perpendicular to each other and we wish to know if the part has been cut properly. An example of an optical configuration that may be able to accomplish this is shown in FIG. 14.

In FIG. 14, the part 300 is illuminated using multiple laser beams from different optical measurement units 100, each containing a glass plate and one or more laser detector modules. Measurement of perpendicularity of both internal and external angles is shown. Mirrors 302 are added to measure external angles. It is not necessary to measure perpendicularity for all angles, since if two parallel surfaces are perpendicular, intersecting surfaces that are parallel to these surfaces are perpendicular to each other.

Additional Angular Measurements

We have already shown that the proposed system could be used to measure parallelism and perpendicularity of multiple flat surfaces on complex prismatic parts. With small variations the same instrumentation can also measure other relative angles.

Measurement of 45° Angles

The above-described technique for measuring perpendicularity to set up a mirror perpendicular to the glass plate of one of the optical measuring units is used to measure 45° angles. A part 310 is placed in position to determine whether one surface has been machined at a 45° angle relative to another surface. It is not necessary that the surfaces be adjacent to each other. Both internal and external angles can be measured. The principle is shown in FIG. 15.

In FIG. 15, a mirror 312 has been set perpendicular to the glass plate of an optical measurement unit. One surface of the part 310 is aligned parallel to the glass plate of the optical measurement unit 100. If the supplement to the interior angle of the part is 45°, a beam reflected from the second surface will be perpendicular to the mirror and will be reflected back onto itself. A focused spot that is not at the reference position means that the angle is not precisely 45° and the error can be calculated. The system is designed so that there is enough intensity in the return beam for the focused spot to be detected.

Measurement of 60° Angles

If the laser beam is reflected at an angle greater than 45° from the part surface it will be deflected away from the optical measurement unit. If on the second bounce the beam intersects the surface of the part at 90° the beam will again be reflected back on itself. The angle at which this happens is 60°. The same system is therefore capable of measuring 60° supplements of interior angles (FIG. 16).

Measurement of 30° Angles

Thirty degree angles could be measured using the same principle. This is shown in FIG. 17. Since high reflectivity from the glass plate is needed for the beam from one of the optical units 100 but not the other, a reflective coating can be deposited on part of the glass surface to vary.the reflectivity as needed over the surface of the glass. It is easy to see that both thirty and sixty degree supplementary angles could be measured simultaneously using the system of FIG. 17.

Determining Whether Two Surfaces Are Aligned At An Arbitrary Angle

Assuming we have two reference mirrors aligned at the desired angle, we can compare any other two adjacent surfaces to determine whether they are aligned at the same angle. First we need to align one surface of the part 320 parallel to a corresponding surface of the reference part 322. This can be a surface that does not form one of the two surfaces to be measured if the relation between the reference surfaces and the surfaces to be measured is known.

After the part 320 and reference part 322 have been aligned, a second optical measurement unit 100 is aligned so that the beam reflects back on itself after being reflected from both mirror surfaces of the reference part (FIG. 18). If a parallel beam from a second laser in the second optical measurement unit 100 also reflects back on itself after being reflected from both surfaces of the part to be measured, then the angle of the part 320 equals the angle of the reference part 322.

The two parts need not be measured simultaneously. The reference part can be used to position the optical beams relative to each other. The reference part can then be taken away and the part to be tested can be inserted. If one surface is aligned perpendicular to one beam and the second beam returns on itself, then two angles are equal.

If the angle to be measured is large enough that both flat surfaces can be directly accessed by beams perpendicular to their surfaces, the angles can be compared by first aligning one surface of the part and reference part parallel to each other and then aligning the second optical unit so that one beam is perpendicular to the second surface of the reference part. If a second beam from this unit is perpendicular to the second surface of the part being measured, then the angle of the part will equal the angle of the reference part (FIG. 19. This technique can also be used to measure exterior angles.

Setting Specific Reference Angles

If one compares the angle between two surfaces of a part 330 with a reference part 332, it does not matter how that reference part is obtained. However, the optical measurement system 100 developed could also be used to set some specific reference angles. We already know that using this system we can set mirror surfaces to angles of 30, 45, 60 and 90 degrees. Using highly reflective surfaces one can measure a series of additional angles.

Set a mirror perpendicular to the glass plate of an optical measuring unit 100 using a second optical measuring unit 100 to measure perpendicularity. Then realign the second optical unit 100 so that its beam is perpendicular to the mirror. We will now have two laser beams that are perpendicular to each other. We wish to use these two beams to set the angle between two mirrors that will be used as reference mirrors.

Align one of the reference mirrors 340 perpendicular to a laser beam. The second reference mirror 342 will be positioned to intercept the second laser beam at an acute angle. Adjust the angle of the second mirror 342 with respect to the first 340 so that the second beam reflects back on itself. This will happen when the beam is perpendicular to the surface of one of the mirrors at the farthest point of reflection (FIG. 20) and will occur only for specific angles.

For a given number of reflections, one can calculate the angle between the surfaces that satisfies this condition. The table below gives the angle θ between the reference mirrors as a function of the number of reflection points N. The equation used to calculate each angle is given. FIG. 21 shows a case with six reflection points. Once the reference angle has been set, the mirrors can be fastened to a rigid base that maintains the reference angle so it can be compared with the angle between two machined surfaces.

| N | θ | Final Bounce Equation |
|---|---|---|
| 1 | 90 | 90 − 0θ = θ |
| 2 | 45 | 90 − 1θ = θ |
| 3 | 30 | 90 − 2θ = θ |
| 4 | 22.5 | 90 − 3θ = θ |
| 5 | 18 | 90 − 4θ = θ |
| 6 | 15 | 90 − 5θ = θ |

The complements of any of these angles can be obtained by first setting two mirrors at one of the reference angles, then setting a third mirror perpendicular to one of the mirrors, removing the base mirror and leaving two mirrors set at the complementary angle. For the examples above, this will enable one to set reference angles at 60, 67.5, 72 and 75 degrees. For angles greater than 90° one can use a base mirror and 2 two-sided reflectors each one set at one of the fixed reference angles. This is shown in FIG. 22.

Setting Reference Angles At Half Angle Values

If we can set two mirrors at a reference value we can also set two mirrors at half the angle of the reference mirrors. The way that this can be done is shown in FIG. 23. In FIG. 23, two planes 350. 352 are set at a given reference angle θ. A laser beam is set perpendicular to one of the surfaces. If we insert a third mirror 354 into the beam and rotate the mirror 354 so that the reflected beam is incident perpendicular to the second mirror 352, the laser beam will reflect back on itself. The angle at which the third mirror 354 is aligned relative to the base mirror will be exactly half the angle between the first two mirrors 350. 352. This process can be repeated to obtain an angle θ/4, etc. Using the techniques described above a large number of possible reference angles over a wide range can be determined.

Proof that the second angle is half the value of the first:

Let γ be the angle of incidence of the light on the inserted mirror (FIG. 24). Line FG is perpendicular to line AO. Therefore, from triangle AOG $$90-\alpha+\gamma=90$$

or $$\alpha=\gamma$$

Angle DOC equals 2γ, but since angle ACB equals 90−(α+φ) it also equals α+φ. Therefore, $$\alpha=\phi$$

and the plane of the mirror bisects the angle. Therefore, if we can set up a specific reference angle we can also create a set of reference mirrors with half that angle between them.

Systematic Errors

One potential problem that may be encountered using this invention or any device that uses laser beams to determine alignment is beam drift. The beam of the diode laser may wander within a small range of angles due to thermal effects in the laser. If this effect is not corrected or taken into account, systematic errors in evaluation of the data may be produced.

There are a number of potential ways of dealing with this problem. One is to employ a temperature-stabilized diode laser with minimal drift. A second potential solution is to encase the laser in a metal heat sink to maintain a constant temperature environment. A third way was suggested by J. He in his 1998 PhD thesis at the University of Michigan. In this approach laser light would be transported through a single mode fiber-optic cable that is clamped in a fixed position at one end. The point at which the light emerges from the fiber then becomes the fixed source of light used by the system.

A fourth way of dealing with this problem is to split off part of the beam from the laser, monitor the beam for angular deviations and correct the analysis of the data to take account of these deviations. Any or all of these approaches could be used with this invention. If the beam drift is measured and found to be negligible, corrective action need not be taken.

Figure 25:
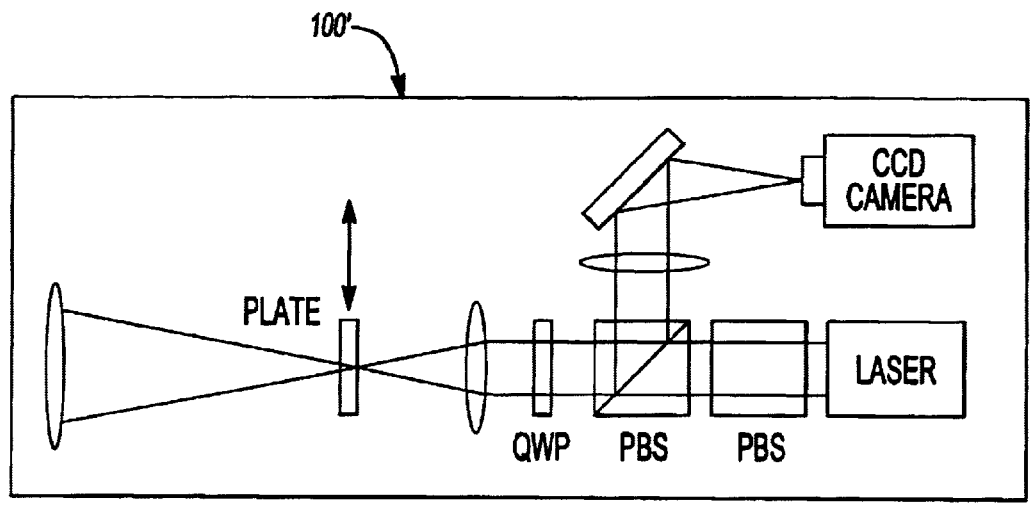
FIG. 25 is a top schematic view of a modified optical module including a detector to monitor beam drift.
Figure 26:
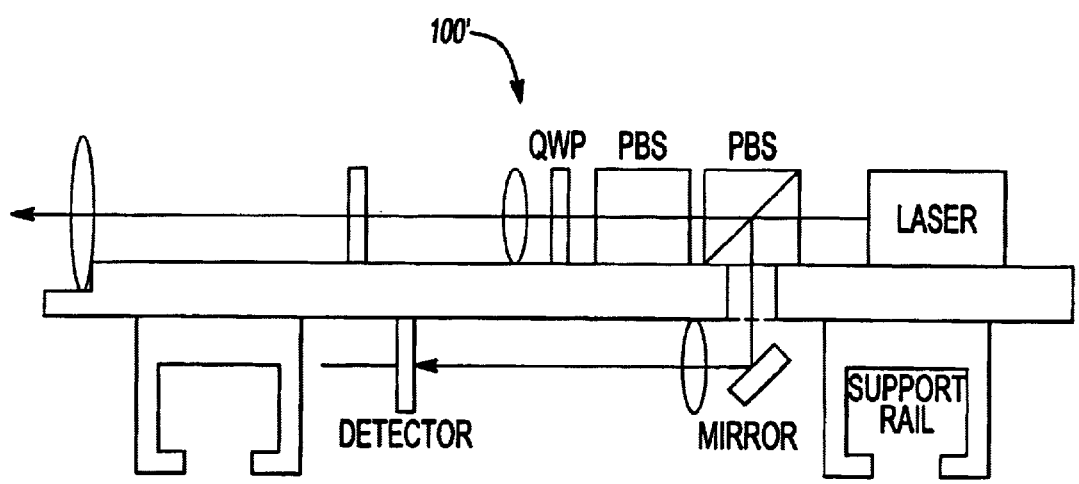
FIG. 26 is a side view of the modified optical module of FIG. 25.

If it is decided to monitor the beam drift by integrating a monitoring detector into the design of the optical module 100' of FIG. 3, part of the beam could be split off from the beam exiting the laser. This beam could then be focused onto a position-sensitive optical detector using a lens or a system of lenses designed to amplify the angular deviation so it would be easier to measure. This is shown in FIGS. 25 and 26 wherein FIG. 26 is a side view of the top schematic view of FIG. 25.

The present invention is based on the use of simple principles of geometric optics that are applied to the measurement of the alignment of flat machined surfaces. The method and system of the present invention may make multiple simultaneous measurements of machined parts. Whereas the Perceptron system is primarily used to measure surfaces that are not flat, the method and system of the present invention is used to measure flat surfaces. Also, the system of the present invention is one or two orders of magnitude more accurate than the Perceptron system.

While the best mode for carrying out the invention has been described in detail, those familiar with the art to which this invention relates will recognize various alternative designs and embodiments for practicing the invention as defined by the following claims.

What is claimed is:

1. An optical method for measuring angular alignment of a first surface relative to a second surface, said method comprising:
   providing a reference surface;
   directing a first light beam at said reference surface to define a reference signal;
   directing a second light beam at the first surface to define a first reflected signal;
   directing a third light beam at the second surface to define a second reflected signal;
   receiving said reference signal to define a reference spot;
   receiving said first reflected signal and said second reflected signal to define first and second measuring spots, respectively; and
   measuring a relative position of said reference spot and said first measuring spot and further measuring a relative position of said reference spot and said second measuring spot to produce a surface measurement signal representing angular alignment of the first surface relative to the second surface.

2. An optical system for measuring angular alignment of a pair of surfaces on a part, said system comprising:
   a reference surface;
   a laser directing a beam at said reference surface to produce a reference light signal, said laser being operable to direct said beam at each of the pair of surfaces to produce a pair of reflected light signals;
   an optical component receiving said reference light signal and said pair of reflected light signals, said optical component being operable to output a reference spot in response to said reference light signal and a pair of measuring spots in response to said pair of reflected light signals; and
   a photodetector detecting said reference spot and said pair of measuring spots, said photodetector being operable to determine a relative position of said reference spot and each of said pair of measuring spots and outputting surface measurement signals that represent an angular alignment of the.pair of surfaces.

3. The optical system according to claim 2, further comprising:
   a pair of spaced apart mirrors capable of receiving the part therebetween, said pair of spaced apart mirrors being operable to reflect the pair of reflected light signals at the pair of surfaces on the part.

4. The optical system according to claim 2, further comprising:
   a polarizing beam splitter disposed downstream from said laser for receiving and splitting said beam; and
   a quarter wave plate disposed downstream from said polarizing beam splitter.

5. The optical system according to claim 2, further comprising:
   a monitoring detector monitoring said beam from said laser.

6. The method of claim 1 wherein the angular alignment is parallelism of the first and second surfaces.

7. The method of claim 1 wherein the angular alignment is perpendicularity of the first and second surfaces.

8. The method of claim 1 wherein the first surface is disposed on a first part and said second surface is disposed on a second part, said first part being separate from said second part.

9. The method as of claim 1 wherein said first and second measuring spots are separated by a distance and wherein the method further comprises:
   processing said surface measurement signal to obtain the deviation from a desired angular alignment of the first surface relative to the second surface.

10. The method of claim 1 wherein the beams of controlled light are collimated light beams.

11. The method of claim 10 wherein the collimated light beams are laser beams.

12. The method of 1 wherein said measuring a relative position of said reference spot and said first measuring spot and said measuring a relative position of said reference Spot and said second measuring spot is performed separately for improved resolution.

13. The method of claim 1 wherein said measuring a relative position of said reference spot and said first measuring spot and said measuring a relative position of said reference spot and said second measuring spot is performed substantially simultaneously.

14. The method of claim 1 wherein said second light beam is a portion of first light beam.

15. An optical method for rapidly measuring angular alignment of a pair of flat surfaces on at least one part, the method comprising:

providing at least one flat reference surface;

directing at least one beam of controlled light at the at least one reference surface to generate at least one corresponding reflected reference light signal;

directing a measuring beam of controlled light at each of the pair of surfaces on the at least one part to generate a corresponding pair of reflected light signals;

receiving the at least one reference light signal and the pair of reflected light signals with at least one optical component for creating at least one reference spot from the at least one reference light signal and a pair of measuring spots of light from the pair of reflected light signals in at least one detector plane; and measuring position of radiant energy in the at least one reference spot and the measuring spots in the at least one detector plane to produce surface measurement signals which represent angular alignment of the pair of surfaces.

16. An optical system for rapidly measuring angular alignment of a pair of flat surfaces on at least one part, the system comprising:

at least one flat reference surface;

first means for directing at least one beam of controlled light at the at least one reference surface to generate at least one reflected reference light signal;

second means for directing a measuring beam of controlled light at each of the pair of surfaces on the at least one part to generate a corresponding pair of reflected light signals;

at least one optical component for receiving the at least one reflected reference light signal and the pair of reflected light signals for creating at least one reference spot from the at least one reference light signal and a pair of measuring spots from the pair of reflected light signals in at least one detector plane; and at least one photodetector for measuring position of radiant energy in the at least one reference spot and the pair of measuring spots in the at least one detector plane to produce surface measurement signals which represent angular alignment of the pair of, surfaces.

17. The system as claimed in claim 16 wherein the first and second means include a single laser.

18. The system as claimed in claim 16 further comprising a pair of mirrors spaced apart to receive the at least one part therebetween to reflect the pair of reflected light signals at the pair of surfaces on the at least one part.

19. The system as claimed in claim 16 wherein each of the measuring spots is created in a separate detector plane and wherein a separate photodetector measures position of radiant energy in each detector plane.

20. The system as claimed in claim 16 further comprising a reference part having a pair of flat surfaces having a desired angular alignment corresponding to the angular alignment of the surfaces on the at least one part.

21. The system as claimed in claim 16 further comprising a housing for housing the first and second means, the at least one optical component and the at least one photodetector therein, wherein the housing has an opening therein and a flat glass plate having the at least one reference surface supported within the opening.

22. The system as claimed in claim 16 wherein the first and second means includes a polarizing beam splitter and a quarter wave plate for directing the at least one beam of controlled light and at least one of the measuring beams and for receiving the at least one reflected reference light signal and at least one of the pair of reflected light signals.

23. The system as claimed in claim 16 further comprising at least one mirror adapted to be mounted on the at least one part to provide at least one flat reflective surface on the at least one part.

24. The system as claimed in claim 16 further comprising a monitoring detector for monitoring one of the beams of controlled light.

25. The system as claimed in claim 16 further comprising a mirror adapted to be mounted in contact with one of the surfaces to be measured so that a reflective surface of the mirror is parallel to the surface to be measured.

26. The system as claimed in claim 16 further comprising a liquid or solid film adapted to be applied on one of the surfaces to be measured to obtain a modified surface wherein the modified surface is either parallel to the surface to be measured or deviates from parallelism in a known way.

* * * * *

UNITED STATES PATENT AND TRADEMARK OFFICE
CERTIFICATE OF CORRECTION

PATENT NO. : 6,674,521 B1
DATED : January 6, 2004
INVENTOR(S) : Stephen B. Segall and Juris Upatnieks It is certified that error appears in the above-identified patent and that said Letters Patent is hereby corrected as shown below:

Column 16,
Line 51, after "method" delete "is".
Line 61, after "method of" insert -- claim --.
Line 63, "Spot" should be -- spot --.

Column 18,
Line 3, after "pair of" delete ",".

Signed and Sealed this

Twenty-second Day of March, 2005

JON W. DUDAS
*Director of the United States Patent and Trademark Office*